United States Patent [19]

Williams, 3rd

[11] Patent Number: 4,782,697
[45] Date of Patent: Nov. 8, 1988

[54] ACOUSTIC CURRENT METER

[76] Inventor: Albert J. Williams, 3rd, P.O. Box 308, Woodshole, Mass. 02543

[21] Appl. No.: 892,182

[22] Filed: Jul. 31, 1986

[51] Int. Cl.⁴ .......................... G01W 1/02; G01F 1/66
[52] U.S. Cl. .................................. 73/170 A; 73/189; 73/861.27
[58] Field of Search .................. 73/189, 170 A, 861.27

[56] References Cited

U.S. PATENT DOCUMENTS

| 3,435,677 | 4/1969 | Gardner | 73/189 |
| 3,949,605 | 4/1976 | Stallworth et al. | 73/189 X |
| 4,162,630 | 7/1979 | Johnson | 73/861.27 |
| 4,202,210 | 5/1980 | Multon et al. | 73/861.28 |
| 4,221,128 | 9/1980 | Lawson et al. | 73/170 A X |
| 4,424,715 | 1/1984 | Hansen | 73/861.28 |
| 4,480,323 | 10/1984 | Page | 73/170 A X |
| 4,653,034 | 3/1987 | Hoover et al. | 73/170 A X |

OTHER PUBLICATIONS

Lawson, Jr. et al., "A Three-Axis Acoustic Current Mete . . . Turbulence", Inter'l. Inst'n. Symp'm. Conf., 5/1976, pp. 501–507.
Heldebrandt, et al., "The Development and Testing . . . Continental Shelf", Oceans' 78 Conf., 9/1978, pp. 308–314.
Kushnir, et al., "Measurement of the Parameters . . . Profiling Device", Oceanology, vol. 20, No. 6, 1980, pp. 729–732.
A. J. Williams, III, et al., "An Acoustic Sensor . . . Bounding Layer Studies", *Woods Hole Ocean. Inst.*, No. 3843, 1977, pp. 83–97.
A. J. Williams, III, "Bass, An Acoustic . . .", *Marine Geology*, vol. 66, 1985, pp. 345–355.

Primary Examiner—Charles A. Ruehl
Attorney, Agent, or Firm—Norman E. Brunell

[57] ABSTRACT

An acoustic travel time flow meter, for use in measuring turbulent vector flow data, capable of extended deployment in which acoustic pulse generation and measurement are interleaved to conserve battery power and compressed data, sufficient to reconstruct turbulent flow data, are derived from instantaneous measurements to conserve data storage. Transmitter output and receiver input impedances are matched to reduce instrument error.

5 Claims, 10 Drawing Sheets

TRANSDUCER 24 AS TRANSMITTER

TRANSDUCER 36 AS RECEIVER

RADIATION RELATIONS:

$i_2(t) = e_1(t-\Delta) G$   FOR TRANSMISSION FROM 24 TO 36

$i_1(t) = e_2(t-\Delta') G$   FOR TRANSMISSION FROM 36 TO 24

$Z = R + X_C + X_L$ $$e_1 = \frac{e_s R_1}{R_s\left(\frac{Z_1}{X_{C_1}} + 1\right) + Z_1}$$

FIG. 3

$$i_{out} = \frac{i_2 R_2}{R_L\left(\frac{Z_2}{X_{C_2}} + 1\right) + Z_2}$$

$$i_{out} = \frac{e_s(t-\Delta) G R_1 R_2}{\left[R_s\left(\frac{Z_1}{X_{C_1}} + 1\right) + Z_1\right]\left[R_L\left(\frac{Z_2}{X_{C_2}} + 1\right) + Z_2\right]}$$

TIMING OF MEASUREMENT CYCLE

ACOUSTIC CURRENT METER

BACKGROUND OF THE INVENTION

1. Field of the Invention

The present invention relates generally to improved method and apparatus for deep-sea boundary layer flow measurement, particularly those in which battery operated, autonomous instrumentation is used to make vector velocity measurements and vector velocity component products for long periods of time. In particular, this invention relates to acoustic travel time measurements of three dimensional vector velocity and techniques for extending the deployments of instruments for making such measurements.

2. Description of the Prior Art

Acoustic flow meters for measurement in restricted channels and pipes have developed rapidly in the last twenty years. Measurements of transit time for acoustic pulses over a fixed path have been replaced by measurements of differential transit time for pulses transmitted in opposite directions along a single path. Sequentially measured travel times have been replaced by measurements made with oppositely directed pulses along a single path transmitted simultaneously. Each enhancement has increased the accuracy.

Meanwhile, ocean or open channel flow has been measured by current meters utilizing mechanical, electromagnetic, or acoustic sensors, both Doppler and transit time. Turbulence sensors have been developed for laboratory flow measurements utilizing heated sensors and Doppler scattering of light but these have not been notably successful in autonomous deployments in the ocean due to fouling in the former case and lack of scatterers in the latter case.

An extremely useful configuration of an acoustic travel time sensor for determining three dimensional current vectors of this type is described by the inventor hereof in the paper "BASS, an Acoustic Current Meter Array for Benthic Flow-Field Measurements" by Albert J. Williams 3rd, Marine Geology, vol. 66, pp 345-355, 1985. In that configuration a bottom mounted tripod containing a tower of six acoustic current meters measuring velocity vectors is described. Instantaneous samples were taken every few minutes to obtain a long time series of velocity in a vertical profile.

An alternate arrangement was disclosed in which a rapid burst of data was taken for a short time, limited by data capacity and battery energy. Reynolds stress and turbulent kinetic energy were calculated from the rapid samples. A limitation of this configuration, however, is that no long period measurements of Reynolds stress and turbulent kinetic energy or of true vector velocity means could be measured because of limitations in battery power and recording medium.

SUMMARY OF THE INVENTION

The present invention resolves these limitations by combining several techniques with power switching to conserve battery power and in situ processing of digital data to reduce the recording capacity in order to permit the determination of a time series of Reynolds stress, turbulent kinetic energy, and vector velocity profile in this boundary region.

Several deployment enhancing techniques are used including the generating of instantaneous vector flow measurements with acoustic pulses in a concentrated measurement interval, conserving battery power between measurement intervals and recording compressed data from the instantaneous data from which turbulent flow data including turbulent flow energy and Reynolds stress can later be recovered. output and receiver input impedances are matched to reduce instrument error.

DETAILED DESCRIPTION OF A PREFERRED EMBODIMENT

The present invention measures Reynolds stress, turbulent kinetic energy, and mean vector velocity profiles in a fluid boundary layer by acoustic travel time measurements. Pulses of sound are transmitted in opposite directions along single paths simultaneously to determine velocity components, three or more of which combined in a single sensor produce a velocity vector, and several such sensors combined in a tower, or tripod, to produce a profile of vector velocities and products of vector velocity components to permit measurements of friction in the bottom boundary layer of the deep-sea.

Reynolds stress is the average value of the product of velocity fluctuations in the streamwise direction with the velocity fluctuations normal to the boundary times the density of the fluid. The density of seawater is well known and can be assumed for this determination. The product of the fluctuations in velocity can be determined by averaging the product of the velocities and subtracting the product of the average velocities. This quantity is a measure of the frictional force transmitted by the turbulent flow through the boundary layer toward the boundary.

Turbulent kinetic energy is another vector velocity component product. It is the average of the square of the velocity fluctuations in the streamwise direction times the density of seawater. It too can be determined by subtracting the square of the average velocity from the average of the squares of the velocities. Averaging is over a period of time long compared to the time scale of the turbulent eddies in the flow but short enough for the flow to be considered steady over the averaging time. Turbulent kinetic energy is another way to estimate the frictional force transmitted across the boundary layer.

Autonomous, long deployments providing profiles of vector velocity and vector velocity component products are achievable with this equipment as a result of the acoustic transducer arrangement, freedom from flow disturbance in the measurement volume, noise cancellation by transducer reversal, precision of velocity determination by using zero crossing of the signal waveform, linearity of velocity determination, flexibility of sensor arrangement on cables, insensitivity to zero drift due to cable capacitance change, freedom from signal crosstalk, vertical arrangement of sensors in a rigid tower, sequencing of measurements with power switching to reduce energy consumption, digital subtraction of measurements in situ to remove electronic drift, accumulation of digital differences for determination of velocity means, formation of digital products and accumulation of those products for determination of the mean of the products, removal of the product of the means from the mean of the products to compress the averaged data, and redundancy in the recorded averages.

Figures 1, 2:
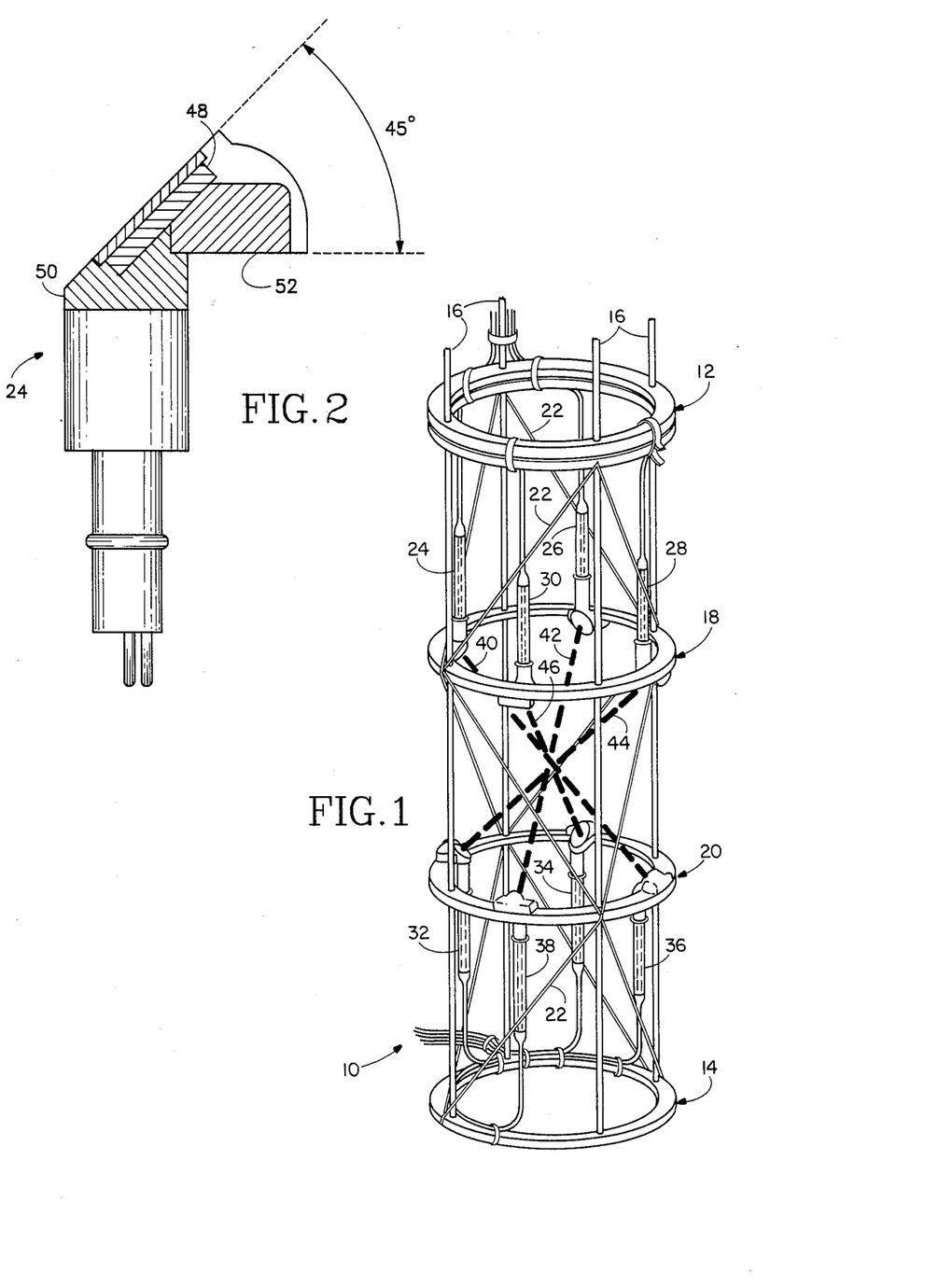
FIG. 1 is an illustration of a four axis acoustic current sensor according to the instant invention.
FIG. 2 is a cross-sectional view of an acoustic piezoceramic transducer in its pressure compensated urethane molding used in the sensor shown in FIG. 1.

FIG. 1 is an illustration of four axis acoustic current sensor 10 according to the instant invention. Sensor 10 includes coupling rings 12 and 14 held firmly in a right cylindrical form by supporting rods 16, each perpendicular to the parallel planes of coupling rings 12 and 14. Upper mounting ring 18 and lower mounting ring 20 are held firmly within sensor 10 in the same manner. Rings 12, 18, 20 and 14 are maintained in rigid alignment by cross bracing 22.

Piezoelectric acoustic transducers 24, 26, 28 and 30 are mounted on, and equally spaced around, upper mounting ring 18. Transducers 24, 26, 28 and 30 are positioned so that their active crystal faces are in planes tilted 45° from the plane of mounting ring 18 aimed inwardly and downwardly with respect to sensor 10. Transducers 32, 34, 36 and 38 are similarly mounted on mounting ring 20 except that they face inwardly and upwardly with respect to sensor 10.

In this way, transducer pair 24 and 36 form first diagonal sensing path 40, shown in the FIG. 1 as a thick broken line. Sensing path 40 forms a 45° angle with the planes of mounting rings 18 and 20. Similarly, transducer pairs 26 and 38, 28 and 32, and 30 and 34 form second, third and fourth sensing paths 42, 44, and 46, respectively. Additional detailed description of sensor 10, and its various components, may be found in the paper "BASS, an Acoustic Current Meter Array for Benthic Flow-Field Measurements" by Albert J. Williams 3rd, Marine Geology, vol. 66, pp 345–355, 1985 referenced above.

Acoustic paths 40, 42, 44 and 46 define the axes along which the vector flow components are measured. Acoustic paths 40, 42, 44 and 46 are all inclined 45° to the vertical to minimize the influence of any wake from mounting rings 18 and 20 on the measurement volume for nearly horizontal flow. These axes are also aligned 90° apart in azimuth. Flow disturbance due to the wake from any transducer, such as transducer 24, is thereby restricted to about 20° from the flow vector and, most importantly, only one axis can be contaminated by this disturbance at a time permitting three undisturbed axes to be used for the current vector determination.

FIG. 2 is a cross-sectional view of acoustic piezoceramic transducer 36 used to illustrate the construction of transducers 24, 26, 28, 30, 32, 34, 36 and 38, all of which are constructed in an identical manner. Piezoceramic disc 48 is potted in acoustically transparent housing 50 so that sound propagates from both faces of disc 48. This exposure to hydrostatic pressure permits transducer 36 to be used to ocean depth. The 45° alignment to horizontal mounting ring 20 is determined by the 45° angle shown between the face of disc 48 and mounting face 52 of housing 50. Mounting face 52 is firmly mounted to mounting ring 20.

Figure 3:
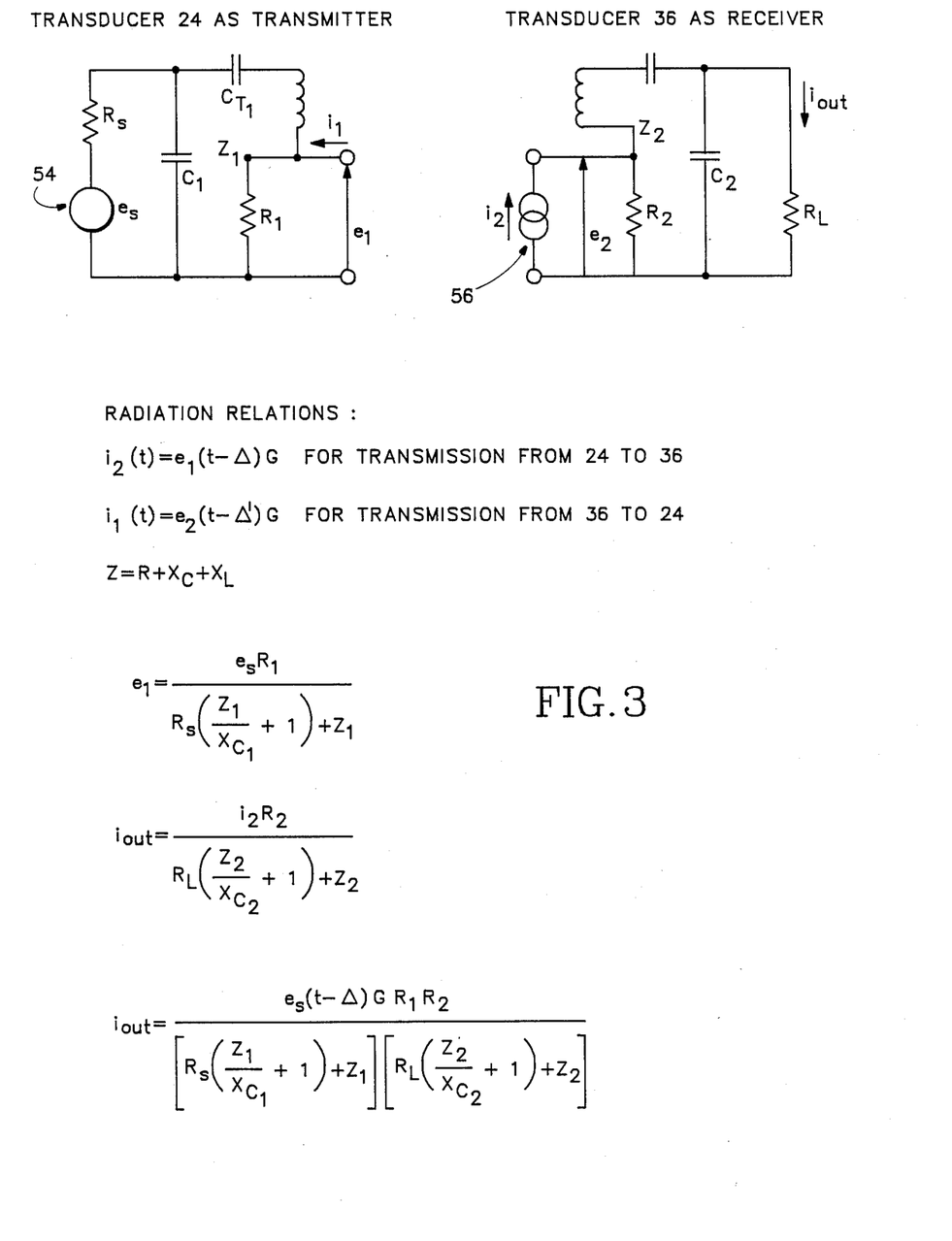
FIG. 3 is the electrical equivalent circuit, and mathematical description thereof, of the acoustic transducer of FIG. 2.

FIG. 3 is a schematic illustration of the electrical equivalent circuit, and mathematical description thereof, of acoustic transducer 24 as a transmitter and transducer 36 as a receiver across path 40. Transducer 24 may be conveniently modeled when operating as a transmitter, as being driven by voltage source 54. Transducer 36, when operating as a receiver, may be modeled by current source 56.

The transfer functions are derived in FIG. 3 in which propagation through sea water is given by transconductance G and time delay delta for transit in one direction and delay delta prime for transit in the other direction. Matching the input impedance of the receiver to the output impedance of the transmitter makes the equation symmetric to reversal of transmitter and receiver, except for the differential transit time.

In practice, this requires that receiver impedance R2 be small. When the equations are symmetric, electrically reversing transducer 24 and 36 as receiver and transmitter changes nothing but the sign of the differential transit time.

Figure 4:
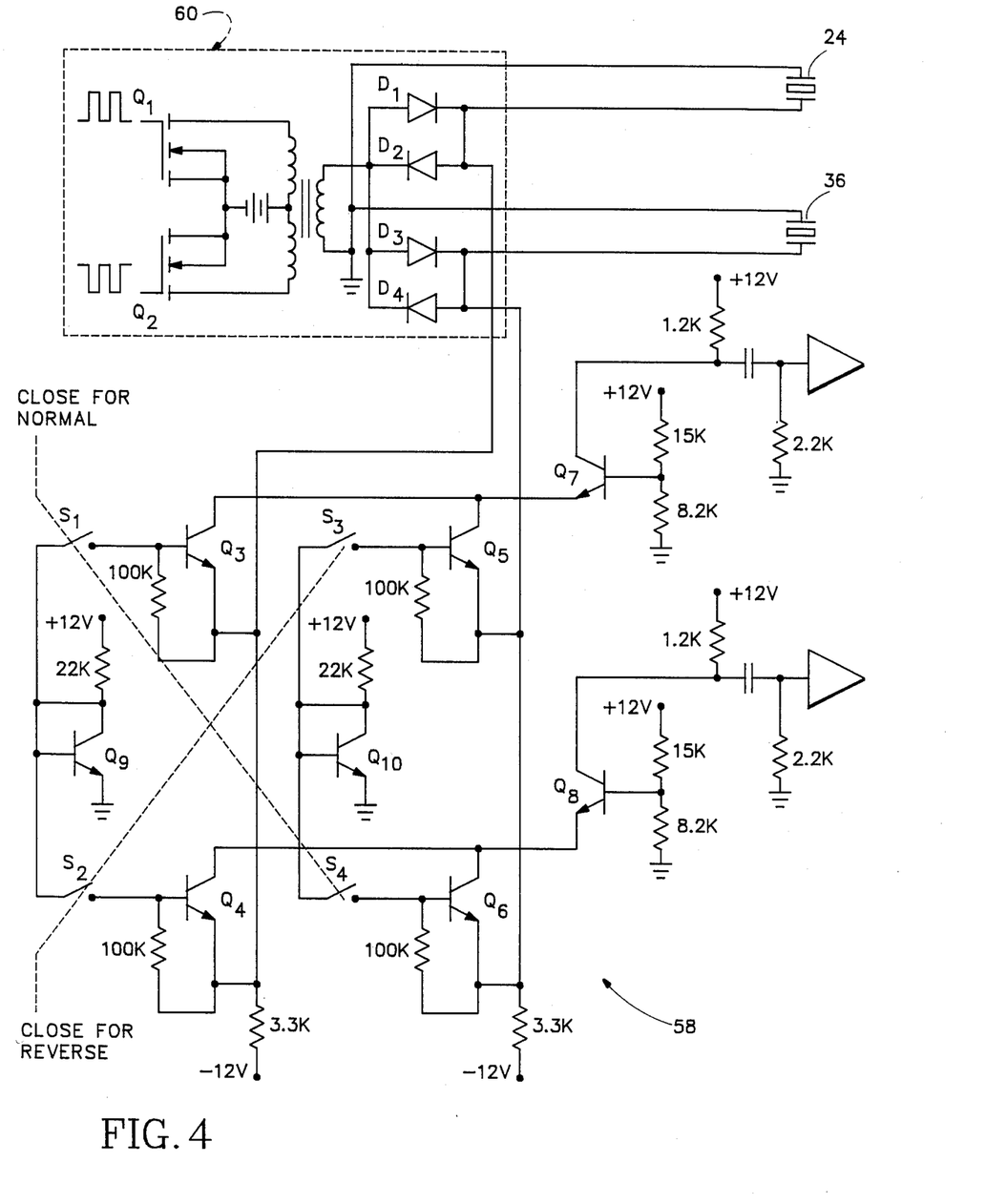
FIG. 4 is a schematic representation of the low impedance source and load for the transducers.

Reversal of transducers 24 and 36, as well as reversals of the other transducer pairs, is accomplished by transistor switch 58 shown in FIG. 4. Nominal resistance and voltage values are shown in the Figure for convenience. Transistors Q3 and Q6 are first turned on by switches S1 and S4 to connect the transducer pair to the remaining output circuitry, discussed below, in a straight through or normal fashion.

The common base connection between these transistors provides a low impedance load to transducers 24 and 36 so they are symmetric to reversal. When switches S1 and S4 are opened and switches S2 and S3 are closed, transistors Q4 and Q5 conduct to connect the transducer pair in reversed order to cascode output transistors Q7 and Q8.

Transmitter 60 uses transistors Q1 and Q2 to drive the transducer pair at the top and the bottom of sensor 10 through transmit/receive diodes D1, D2, D3 and D4. This operation locks the transducer pair together during transmit so the same waveform appears across them but permits them to be disconnected from each other during receive to minimize crosstalk.

Figure 5:
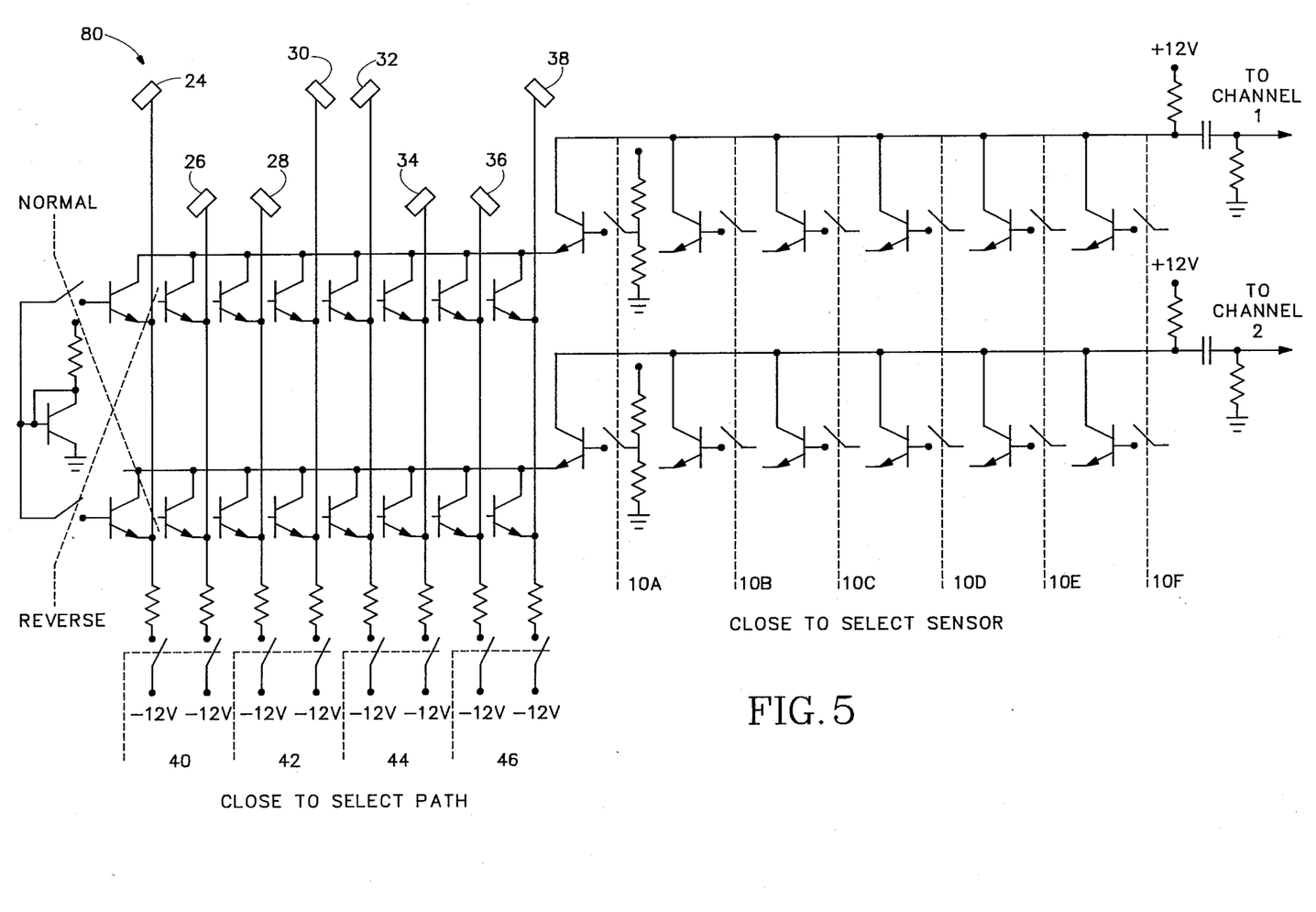
FIG. 5 is a schematic illustration of the transducer multiplexing circuit used with the sensor of the instant invention.

FIG. 5 is a schematic illustration of transducer multiplexor 80 used with sensor 10. Multiplexor 80 serves to combine transducers 24, 26, 28, 30, 32, 34, 36 and 38 to form acoustic paths 40, 42, 44 and 46. The axes of each sensor are selected sequentially and each axis is used twice, once connected in normal and once connected in reverse fashion.

Then the next sensor is selected by turning on the cascode transistors of the next set of receivers. The cascode transistors of all sensors are in parallel but only the ones turned on drive the detecting and measuring circuitry shown in FIG. 6.

Figure 6:
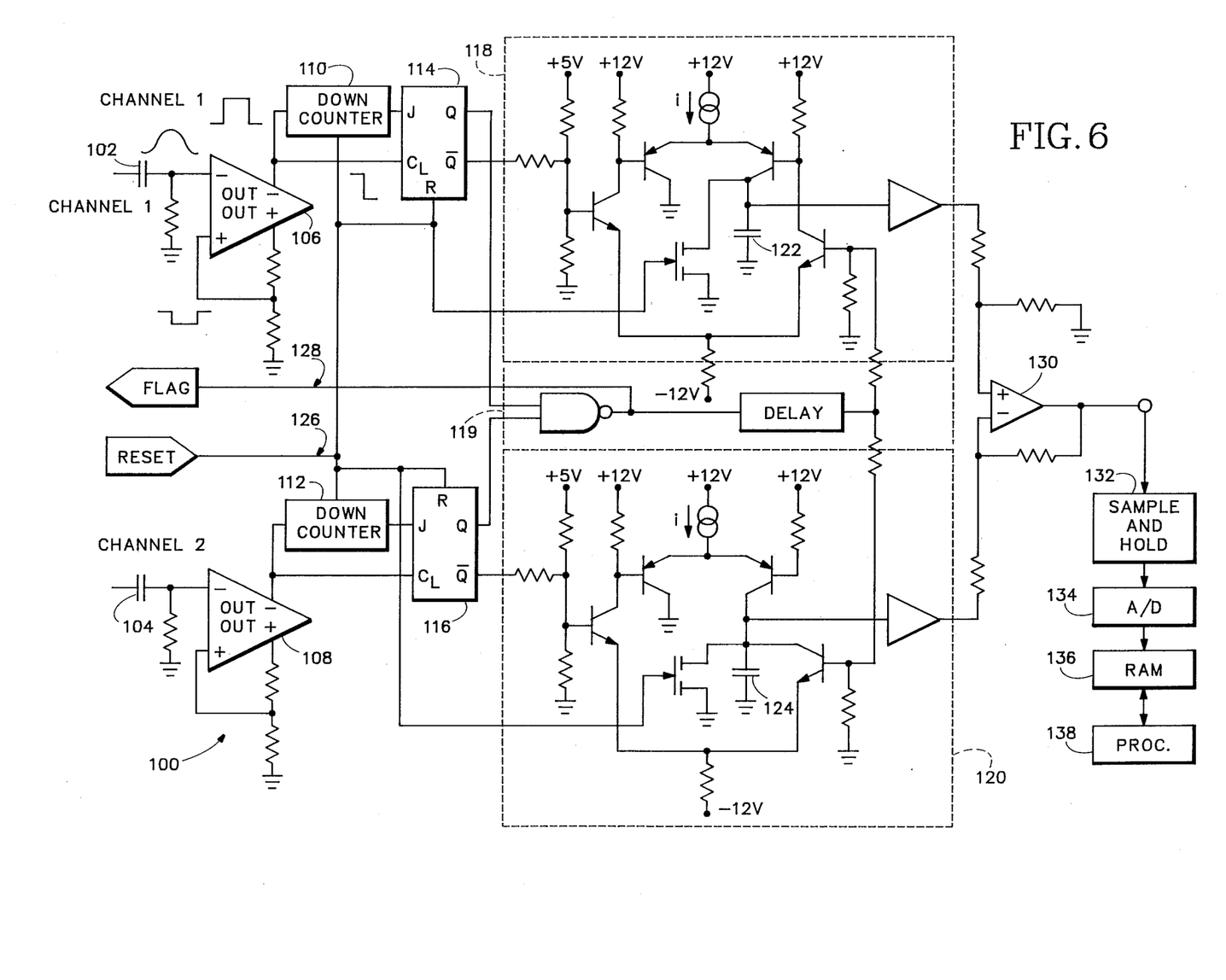
FIG. 6 is a schematic illustration of the differential time to voltage circuit.

FIG. 6 is a schematic illustration of differential time to voltage circuit 100 which is configured with two parallel channels, channel 1 and channel 2, to which the outputs of multiplexor 80 are connected via coupling capacitors 102 and 104. Capacitors 102 and 104 provide the transducer outputs to comparators 106 and 108, respectively, which are configured as Schmitt triggers so they detect the negative going zero crossing of the received signal and are not sensitive to noise before the received pulse arrives.

A burst of cycles are transmitted by the appropriate transducer and only the nth cycle of the received signal is used to trigger the differential time to voltage measurement. This permits the signal amplitude to grow until the voltage slope is large enough to prevent a small voltage offset to convert into an objectionable zero crossing time error.

Down counters 110 and 112 wait for the nth cycle. Flip-flops 114 and 116, connected to the outputs of comparators 106 and 108, respectively, initiate constant current integrators 118 and 120 when triggered by the nth zero crossing. The voltage on integrating capacitors 122 and 124 rises until the constant current source is switched to a current sink. This occurs simultaneously for integrators 118 and 120 at a time slightly after both have been turned in response to delay circuit 119.

The difference in voltage on integrating capacitors 122 and 124 is proportional to the difference in arrival time for the acoustic pulse. This voltage difference is amplified by differential amplifier 130 and the output is sampled by a sample and hold circuit, 132. Down counters 110 and 112 are then reset and integrating capacitors 122 and 124 are discharged by reset pulse 126 before the next measurement is made. If one or both acoustic pulses fail to arrive, flag 128 is set to warn of a bad measurement. Differential time to voltage circuit 100 can service the entire acoustic current meter array including the axes of sensor 10 and the axes of all other sensors in the tripod tower.

Figure 7:
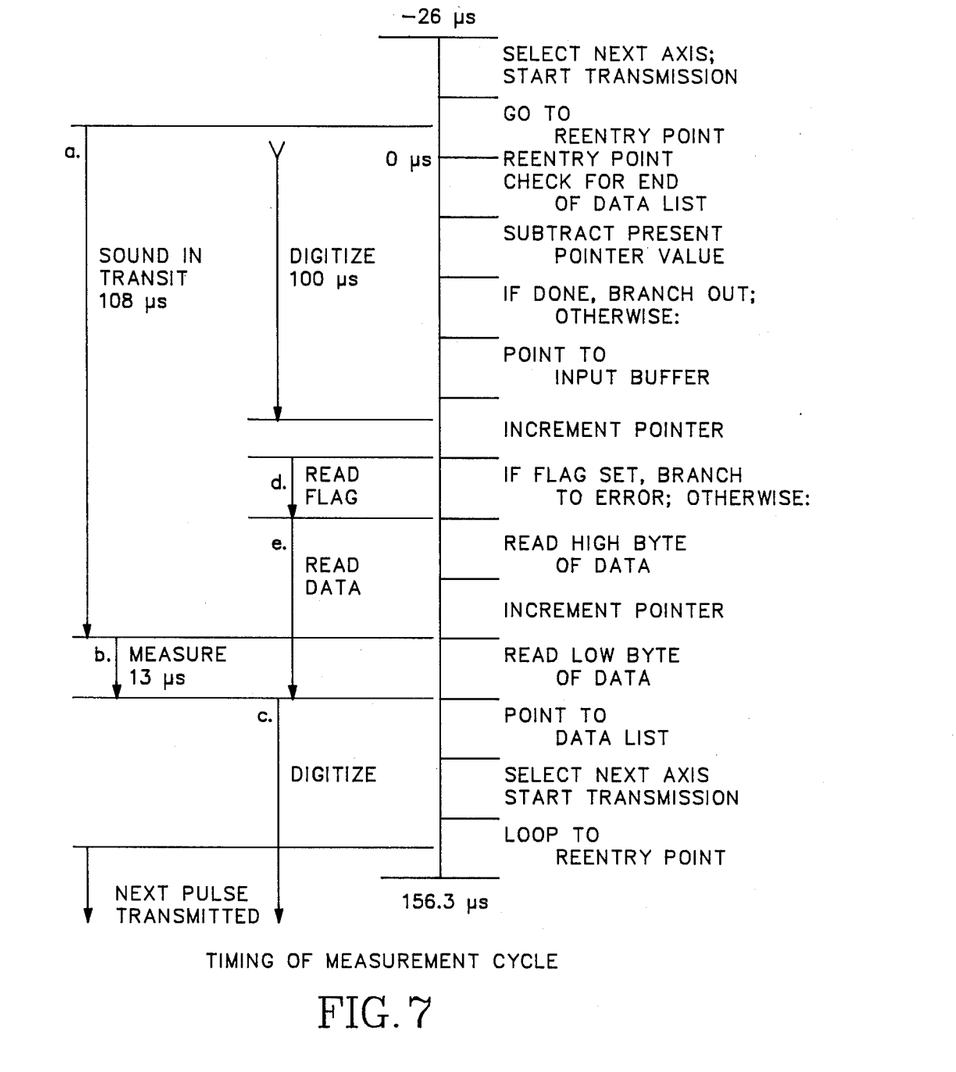
FIG. 7 is a graphical representation of the timing of the measurement cycle.

FIG. 7 is a time chart illustration of the sequence of operations required in making a measurement of one differential transit time. The hardware sequence runs synchronously under the control of a digital microprocessor subroutine, not shown, that selects the next axis to be measured and records the resultant measurement in memory. The selection of sensor pod, acoustic transducer, axis, and normal or reversed configuration starts the sequencer subroutine.

Transmit oscillator 60, shown in FIG. 4, is first turned on, then gated to the transmitting transducer for 8 microseconds. It takes 108 microseconds for the sound to traverse acoustic path 40, 42, 44 or 46 shown as sound transit time "a.". 13 microseconds is then allowed for differential time to voltage integrator 100 to stabilize shown as measurement time "b.", then the differential output voltage from differencer 130, shown in FIG. 6 and connected to the outputs of current integrators 118 and 120, is latched in sample and hold circuit 132 and applied to analog to digital converter 134 which digitizes the voltage during digitize period "c.".

The digitization requires 100 microseconds during which the next axis may selected and the next pulse transmitted. While this next pulse is in transit, digitizer 134 completes the conversion and the error flag for the previous measurement, indicating that one or both pulses failed to arrive, is read during read flag period "d." by the microprocessor, not shown. If the flag is not set, digitizer 134 is read during read data time "c." and integrators 118 and 120, as well as down counters 110 and 112 are reset for the next measurement. If the flag is set, the data are cleared and zero is entered into memory as a flag in place of the bad data.

Thus differential time to voltage circuit 100 is reset for the next measurement. This cycle is continued until the end of the data list is encountered when the pending measurements are processed and stored and the circuits are turned off. This interleaving of pulse transit, digitization, and list checking is useful to minimize the total time that high power circuits must be turned on. A measurement of the 6 sensors in a tripod, with 4 axes each, both normal and reversed, takes less than 8 milliseconds, after which comparators 106 and 108, integrators 118 and 120, differential amplifier 130, A/D converter 134 and their power regulators, not shown, can be powered down to save power and permit long deployments on limited battery power.

The digitized measurement output of A/D converter 134 is then applied to low power Random Access Memory, RAM 136 under the control of processor 138. RAM 136 and processor 138 may be part of a conventional computer system, not shown, configured for these operations by an appropriately written subroutine, or may be part of a specially configured system permitting even lower power drain and battery usage.

In situ processing of data while it is acquired permits long deployments with modest recording capacity without losing the turbulent flow quantities. The turbulent quantities of kinetic energy and Reynolds stress depend on correlations of velocity fluctuations at time scales commensurate with passage of the turbulent eddies through the sensor volume. This is 0.5 second for flows of 30 cm/s and a volume of 15 cm diameter. In a preferred embodiment of this invention, in situ processing is performed on measurements taken at 2 Hz.

Data storage capacity and intended deployment time determine the minimum averaging period for the measured turbulent quantities. Conventional data recorders of 16 million bit capacity can store turbulent quantities and mean velocities from a 6 sensor tripod averaged for 1 hour for a year or averaged for 20 minutes for 4 months. While no information about the changes in the mean or fluctuating quantities is recoverable at periods less than the averaging period, there is no loss in accuracy of determination of the Reynolds stress or turbulent kinetic energy by averaging.

Conventional systems do not process turbulent quantities in situ to extend deployment time without compromising determination of turbulent quantities. In this invention, the in situ processing is done within a pressure case that must be small to minimize flow disturbance which in turn requires that the system be small and draw little power. The small buffer memory, low power, and limited speed of processing constrain the solution of the processing task.

This invention permits twenty minute averages of four axes of flow from 6 sensors to be made with 16 bit precision in a microprocessor system containing 2K bytes of low power RAM, 1 page of very low power RAM, and 2K byte program in EPROM. A preferred system would include an 1802 CMOS microprocessor with a 16 bit hardware multiplier.

The in situ processing performed on the various measurement pairs has been developed to reduce the data storage and battery supply requirements for long autonomous deployments. The in situ data processing steps may be best understood with reference to FIG. 8 which is a flow chart outline of the various data processing steps, and the order of their application required, to reduce the data storage requirements consistent with the energy management system.

Figure 8:
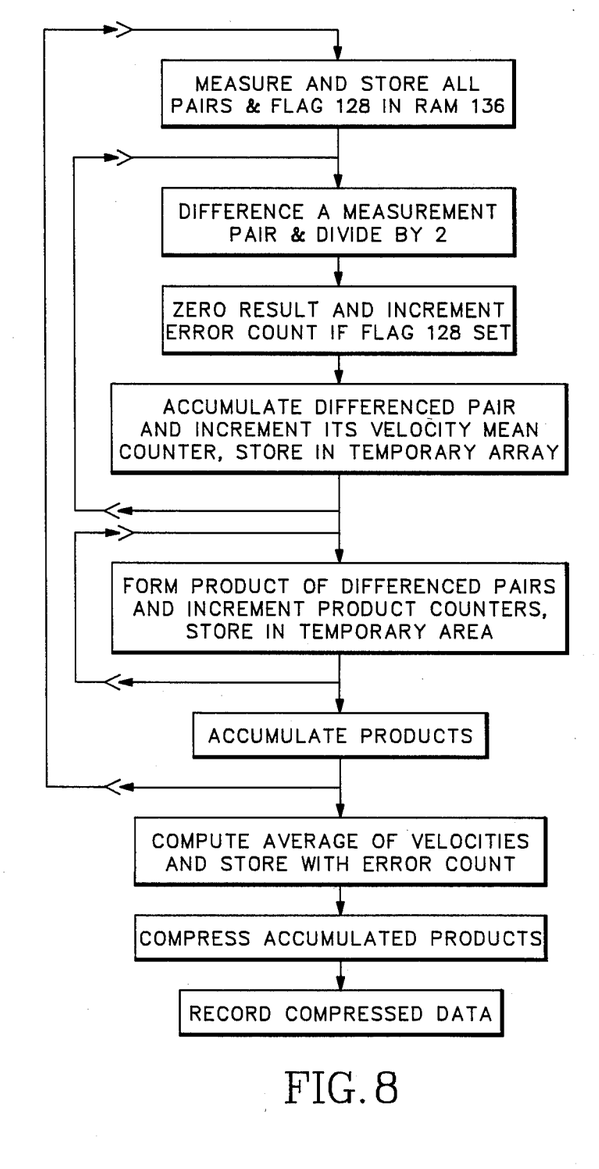
FIG. 8 is a flow chart outline of the in situ data processing steps.

During this in situ data processing, digitized measurements of the instantaneous vector components of flow are differenced and accumulated. The products of these vector components are also accumulated for the interval over which an average is desired. Each measurement with a detected error is flagged and not accumulated or used in forming a product.

A count is kept of each measurement or product contributing to the sum. The accumulated vector component values divided by the count of the measurements contributing to the sum is the mean of that component. The accumulated product divided by the count of the products contributing to the sum is the mean of the product.

The mean of the product minus the product of the means is a smaller number than the mean of the product and, when suitably scaled, represents the turbulent quantities of interest such as turbulent kinetic energy and Reynolds stress.

In particular, with reference now to FIG. 8, the digital measurements output from A/D converter 134, shown in FIG. 6, are stored in RAM 136 as noted above. These data measurements represent measurements of instantaneous flow along a set of three or four substantially mutually perpendicular axes. The measurements are stored temporarily in RAM 136 which may conveniently be configured from very low power RAM because they will be accessed several times per cycle.

The measurements form pairs of 16 bit digitizations, the first measurement of each pair represents the instantaneous flow measured with the transducers connected in normal fashion and the second measurement of each pair representing the instantaneous flow with the transducers connected reverse fashion.

In addition to the aforementioned measurement pairs, the flag bit from flag 128 is stored in RAM 136 to indicate the failure of one or the other pulse to arrive at the transducer. The appropriate measurement is flagged by substituting the value zero, corresponding to negative full scale flow, in place of the actual measurement. Flag 128 is used in subsequent processing steps to prevent bad measurements from contaminating the averages.

Pairs of measurements are subtracted from each other to determine the difference therebetween and the results are then divided by two. This division may conveniently be accomplished in conventional fashion by right shifting a binary number stored in a register representing the measurement pair difference. The difference is again replaced by zero if either of the pairs contained a zero.

This subtraction operation serves to remove low frequency noise, that is, short term drifts, in the electronics. If the difference is set to zero, a counter in an error array is incremented to warn of a possible bad axis. After differencing, the digitization array can be reused.

The differenced measurements, the velocity, is accumulated by adding together the appropriate elements in the velocity array. A counter in another array is incremented if the digital difference is non-zero. Two's complement integer arithmetic may conveniently be used so that FFFF, in hex, represents positive full scale, 8000 in hex, or half scale, represents zero velocity, and 0000 represents negative full scale. The velocity array in RAM 136 provides 4 bytes per element so that up to 9 hours of 2 Hz samples can be accumulated. Two bytes per element are provided in the couter array. After accumulation, the difference array can be reused.

During the next step of in situ processing, thirty two bit products are formed from the velocities. The measurements from each of the axes is multiplied by the others and itself yielding a total of 10 products for the four axes per sensor. These products are stored in a temporary array so that the multiplication can proceed as fast as possible without interruption to save power while the multipliers are turned on.

The product array is added to an accumulated product array. Each element of the accumulated product array is 48 bits. There are 60 elements in the array for a six sensor tripod. As each product is added, it is tested for zero since this flag survives multiplication. A counter array element is incremented if the product is non-zero. There are also 60 elements in this array each of which is 16 bits. After this step, the product array can be reused.

At the end of an averaging period, the averages of both the velocities and the velocity products are computed. Mean velocities are computed by division of the accumulated velocities by the count of non-zero values added to the accumulator array.

This division may conveniently be accomplished by loading the 32 bit value of the accumulated velocity into the dividend registers of two conventional hardware multiply/divide units, not shown, and loading the 16 bit count of the non-zero differences into the divisor registers thereof. The 16 bit quotient may be conveniently stored in an output buffer and then the quotient, and 16 bit remainder, stored back in the velocity accumulator array for further processing.

The error count, that is, the number of zero differences, may also be loaded in an output buffer so the quality of the measurements from that particular axis can be determined.

The 48 bit product accumulators can be compressed to 16 bit averages, as follows. The product of the sums is first subtracted from the sum of the products and the result divided by the count of the products. However the sums must be corrected if the count accumulated in the velocity sum register is not the same as the count accumulated in the product sum register.

From the 48 bit sum of the AB products, where A and B represent the particular vector components in a product pair, four terms are subtracted:
  the count of the products times the mean of A times the mean of B,
  the count of the product times the remainder of A divided by the count of A times the mean of B,
  the count of the products times the remainder of B divided by the count of B times the mean of A, and
  the count of the products times the remainder of A divided by the count of A times the remainder of B divided by the count of B.

The resultant compressed value retains the full precision required to determine significant Reynolds stress and turbulent kinetic energy measurements. Subtraction of these four terms yields a 40 bit result. The least 8 bits are insignificant and may be discarded. The remaining 32 bit quantity is then divided by the 16 bit product count to yield a 16 bit result which represents the product of the fluctuations of velocity about the mean during the averaging period. This result is then stored in long term memory, not shown.

For each sensor such as sensor 10, the mean values of the velocity components along four axes, and a quality word expressed as an error count for each component, are recorded. A bad axis, one with a large error count, can be rejected and the mean vector velocity recovered from the remaining three components.

Ten means of the products of the fluctuations are recorded and a subset of six can be selected to avoid using a bad axis if the error count for that axis is large. The Reynolds stress and turbulent kinetic energy can be recovered from the remaining six measurements in accordance with conventional computations. The in situ processing technique described above is therefore sufficiently redundant to recover all required information even if one axis of sensor 10 is faulty.

Figure 9:
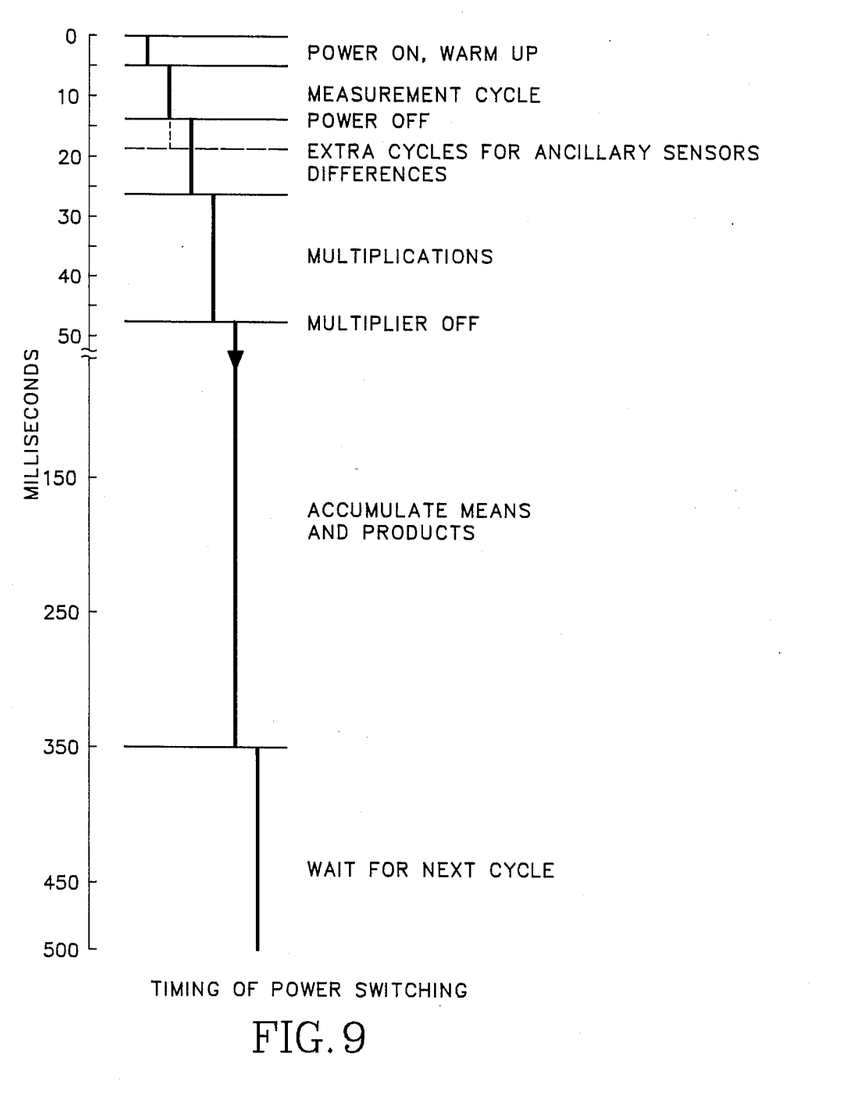
FIG. 9 is a graphical representation of the timing of the power switching.

FIG. 9 is a time chart illustration of the power schedule sequence for a 2 Hertz measurement frequency with sensor 10 in accordance with the in situ data processing technique described above. In general, the measurement of vector components of the flow consumes power while the operational amplifiers, fast comparators, integrators, and analog to digital converters are running. These devices may then be turned off to conserve battery power after all the acoustic pulses used to sample the vector flow components have been received and measured.

This power switching is done in such a way that after the devices are stabilized, they are used intensively to sample each component as rapidly as possible, every 156 microseconds in which the acoustic travel time for the pulse to cross the measurement volume is 100 microseconds, and then turned off. The duty cycle for this switched power is less than 2% for a power saving in the total system of more than 90% over a similar system operated without the power drain reduction scheme.

A warm up period of 5 milliseconds is required for A/D converter 134 to achieve 0.01% accuracy. Acoustic current meter measurements are then made for 8 milliseconds after which ancillary analog sensors, if required, may be measured as well or the power may be turned off.

Turning the power on to make a measurement and off when the measurement is finished is done to save power and was done in the embodiment described in the paper by Williams in 1985. However the warmup time for the measurement described in that paper was 2 seconds so that the power would have been on continuously to measure at 2 Hz. As a consequence, only spot samples at 5 minute intervals were possible with that simple method of saving power. Another power saving technique that seems attractive is to withhold power while the acoustic pulse is traversing the measurement volume but turn on the power only when the differential arrival times are being measured, about 200 nanoseconds for the largest velocities. This is impractical however because the filter capacitors do not discharge in the interval between measurements and no net power saving would be realized.

The realization of power saving depends on batch processing the acoustic measurements and paying the capacitor charging penalty only once per 0.5 seconds rather than every measurement. This way all 48 measurements can be made with a single warmup period and charging cost. The measurement time must be used efficiently to keep the total power consumption low. Functions that can occur in parallel are sequenced to do so. The digitizer is converting a voltage held on the sample and hold circuit while the differential time to voltage converter is settling after measuring the arrival time difference of the next pulse while the third acoustic pulse is in transit across the measurement volume.

The normal and reversed pairs of measurements are next subtracted to remove slowly varying time offsets in the various comparators, flip-flops, and integrators. The result is a cancellation of all electronic drift from reversing switch 58 through digitizer 134. A set of 6 sensors can be processed to this point in 12 milliseconds.

Each pair of numbers to be differenced is examined for a zero in either member and a flag inserted (and the value zero) in place of the actual difference. A count of errors is incremented if an error is found and a tally is maintained for each axis for quality control.

Figure 10:
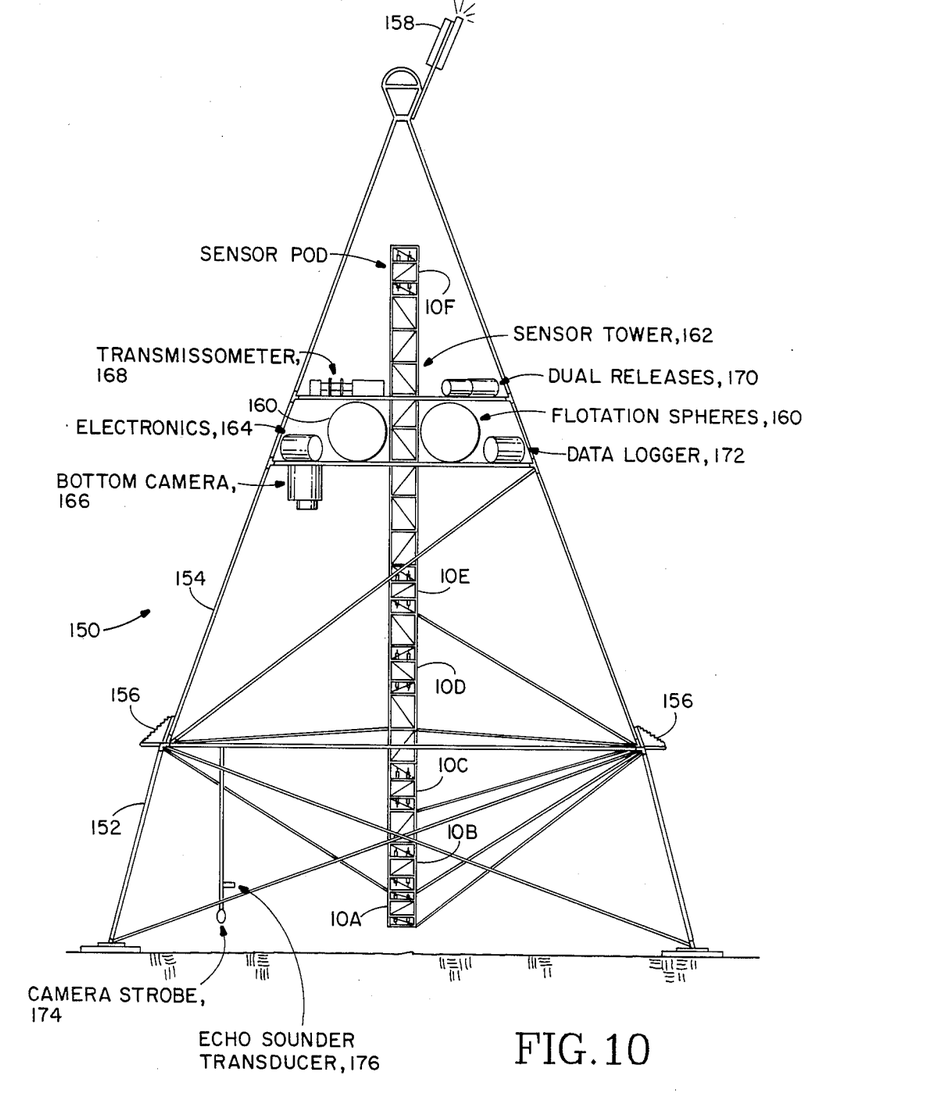
FIG. 10 is a cross sectional view of a bottom mounted tripod including the sensor and electronics housings.

FIG. 10 is a cross sectional view of bottom mounted tripod 150 including the sensor tower and electronics subassemblies. Tripod 150 is constructed in two major sections, foot section 152 and recoverable equipment section 154. When first deployed recoverable equipment section 154 is mounted to foot 152 by means of release latches 156, described below in greater detail with respect to FIG. 11. During recovery after deployment release latches 156 are activated by release timer or command receiver 170. Foot 152 remains on the ocean floor and section 154, rendered positively bouoyant by flotation spheres 160, rises to the surface where it can be recovered.

The heart of tripod 150 is sensor tower 162 containing 6 sensor pods 10 mounted in a vertical array. This permits sensors 10 to measure stress and turbulence at different elevations above the ocean floor for profiling. All the required electronic equipment is contained in electronics module 164 positioned at elevations at which turbulence created thereby does not substantially impinge on sensors 10 mounted within tower 162.

Various other subassemblies may be mounted conveniently at this elevation such as bottom camera 166, transmissometer 168, dual releases 170 and data logger 172 in which the data is recorded. Various other subassemblies may be mounted at other locations where flow disturbances are minimized, such as camera strobe 174 and echo sounder transducer 176 mounted on a strut near the bottom.

Figure 11:
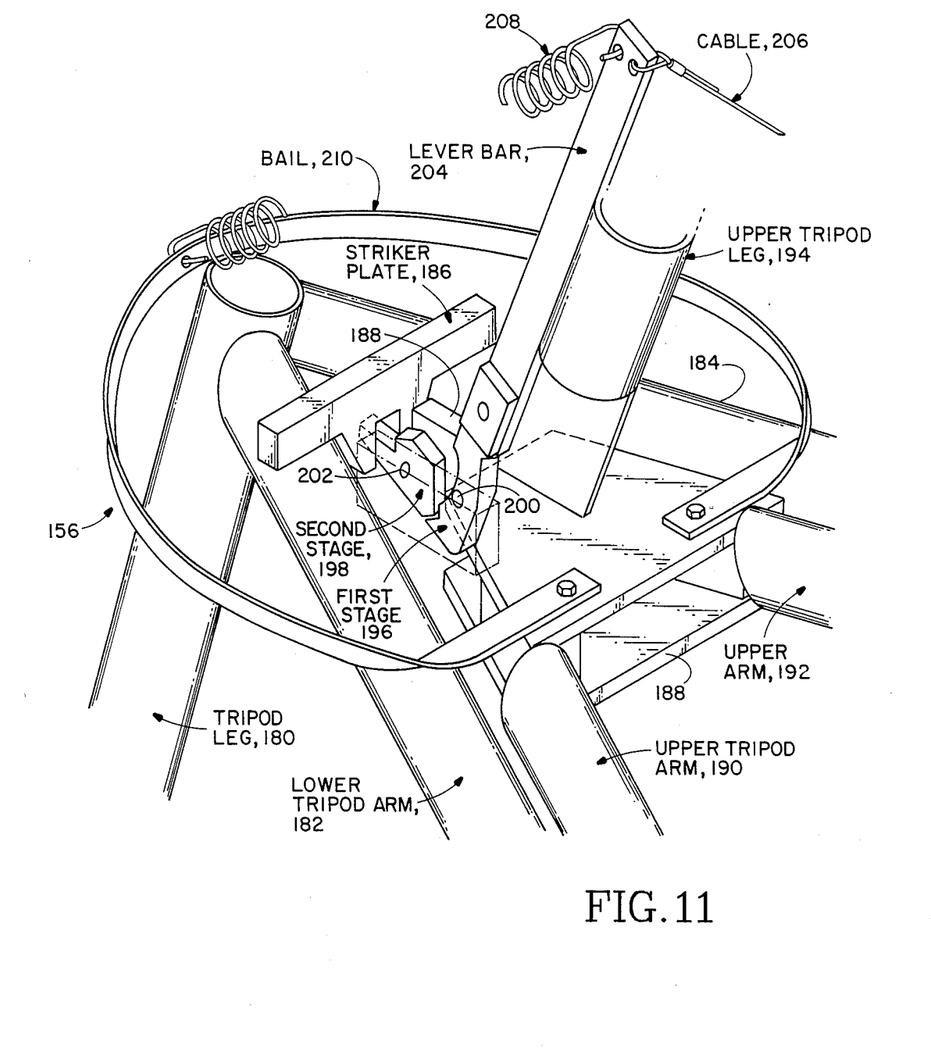
FIG. 11 is a cross sectional view of the release latch for the tripod base.

FIG. 11 is a cross sectional view one of the three release latches 156 interconnecting foot 152 with recoverable electronics section 154. Tripod leg 180 and lower tripod arms 182 and 184 form the upper surface of foot 152. Striker plate 186 is welded or otherwise secured across the juncture of arms 180 and 182 and tripod leg 180.

Mounting plate assembly 188 is secured across the juncture of upper tripod arms 190 and 192 and upper tripod leg 194. First and second stage releases 196 and 198 are pivotally mounted to mounting plate assembly 188 by pins 200 and 202, respectively. First stage latch 196 is rigidly fastened to lever bar 204 which is pivoted in the latched position by cable 206, operated by release 170, shown in FIG. 10. In the latched position shown, a notch in first stage latch 196 engages with and prevents the rotation of a protrusion in second stage latch 198 which, in turn engages striker plate 186.

Upon receipt of the appropriate command indicating desired recovery of equipment 154, releases 170 releases cable 206. Spring 208 attached at one end to bail 210 affixed to mounting plate assembly 188 is attached at the other end to lever bar 204, opposite cable 206. Upon release of cable 206, spring 208 causes counter clockwise rotation of lever bar 204 and first stage latch 196 around pin 200. The upward pull of the positive bouoyancy of upper tripod or recoverable equipment section 154 permits rotation of second stage 198 around pin 202. This releases second stage 198 from striker plate 186 and permits section 154 to float to the surface of the ocean where it can be recovered.

I claim:

1. An acoustic travel time current flow meter comprising:
   means for making instantaneous measurements of turbulent vector flow in ocean currents near the ocean floor;
   means for deriving compressed data therefrom for each of a series of averaging periods sufficient to reconstruct turbulent flow energy and Reynolds stress data; and
   means for recording the compressed data for reconstruction after recovery of the meter from the ocean.

2. The meter of claim 1, wherein the means for making instantaneous measurements further comprises:
   means for sequentially generating and receiving acoustic pulses in the ocean;
   means for measuring a plurality of the acoustic pulses during measurement intervals; and
   means for conserving power between the measurement intervals.

3. The meter of claim 2, wherein the means for generating and receiving acoustic pulses further comprises;
   first acoustic transducer means having an electrical transmitter output impedance and an electrical receiver input impedance;
   second acoustic transducer means having an electrical transmitter output impedance equal to the input impedance of the first transducer means and an electrical receiver input impedance equal to the output impedance of the first transducer means; and
   means for alternatively transmitting and receiving acoustic pulses between the first and second transducer means.

4. The meter of claim 3 wherein the input and output transducer impedances are substantially equal.

5. An acoustic travel time current flow meter comprising:
   battery powered means for sequentially generating and measuring acoustic pulses in the ocean;
   means for measuring a plurality of the acoustic pulses during measurement intervals;
   means for deriving compressed data therefrom for each of a series of averaging periods sufficient to reconstruct turbulent flow energy and Reynolds stress data;
   means for recording the compressed data for reconstruction after recovery of the meter from the ocean, and
   means for conserving battery power between the measurement intervals.

* * * * *